United States Patent [19]

Nakayama et al.

[11] Patent Number: 5,528,898
[45] Date of Patent: Jun. 25, 1996

[54] APPARATUS FOR DETECTING DETERIORATION OF CATALYSTS

[75] Inventors: Masaaki Nakayama, Toyoake; Yasuo Mukai, Kariya, both of Japan

[73] Assignee: Nippondenso Co., Ltd., Kariya, Japan

[21] Appl. No.: 524,446

[22] Filed: Sep. 6, 1995

[30] Foreign Application Priority Data

Sep. 29, 1994 [JP] Japan .................................. 6-261036

[51] Int. Cl.$^6$ ..................................... F01N 3/28
[52] U.S. Cl. ............................... 60/276; 60/277
[58] Field of Search .............................. 60/274, 276, 277

[56] References Cited

U.S. PATENT DOCUMENTS 4,739,614  4/1988  Katsuno et al. ........................ 60/276
5,220,788  6/1993  Kurita et al. ............................ 60/276

FOREIGN PATENT DOCUMENTS 2310453  12/1990  Japan .
5312025   11/1993  Japan .
6317144   11/1994  Japan .

Primary Examiner—Douglas Hart
Attorney, Agent, or Firm—Cushman, Darby & Cushman

[57] ABSTRACT

A catalyst deterioration determination is performed in two stages. In the first stage of determination, an amplitude of an output signal from a downstream oxygen sensor is detected and this amplitude is compared with a reference value in order to determine possible deterioration in a catalyst. When correct performance is expected, while taking into account variations (amplitude and response) in the upstream and downstream oxygen sensors, then the detection in a second stage is omitted. However when possible catalyst deterioration may be present, the determination at the seconds stage is performed. After adjusting the response of the upstream oxygen sensor to the characteristic of the slowest response, the total response delay time of the downstream sensor is obtained within a specified amount of time, and this sum then is compared with a reference value indicating catalyst deterioration. A final determination is made as to whether catalyst deterioration is present.

7 Claims, 10 Drawing Sheets

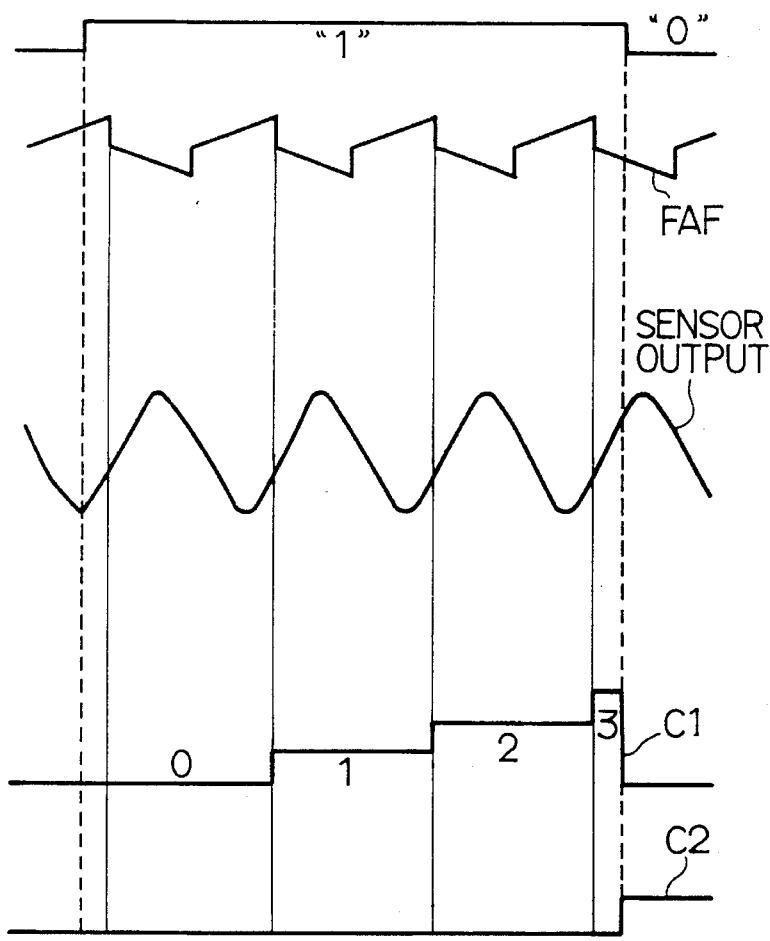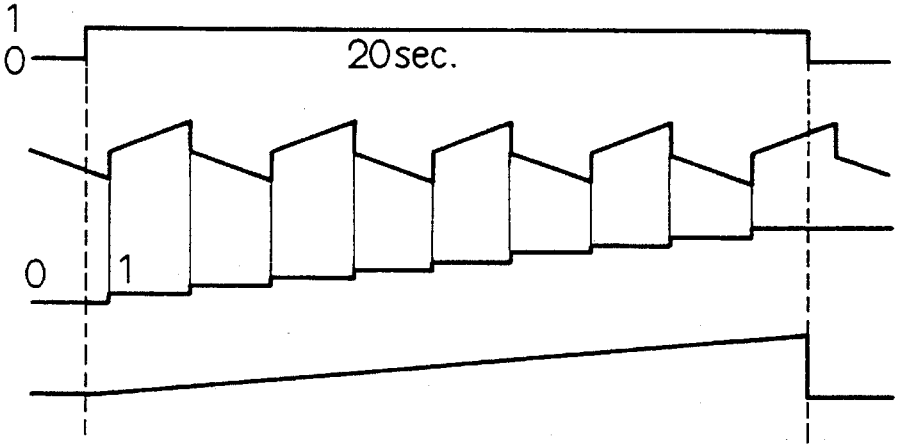

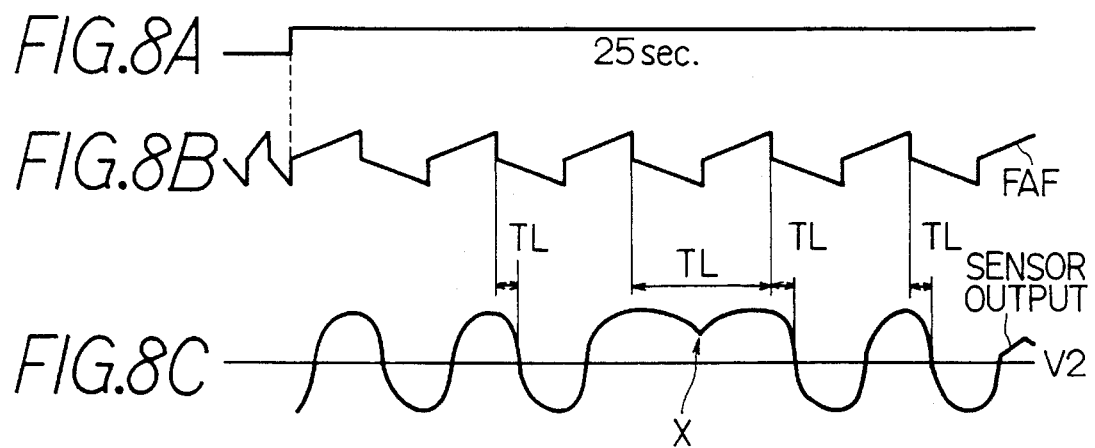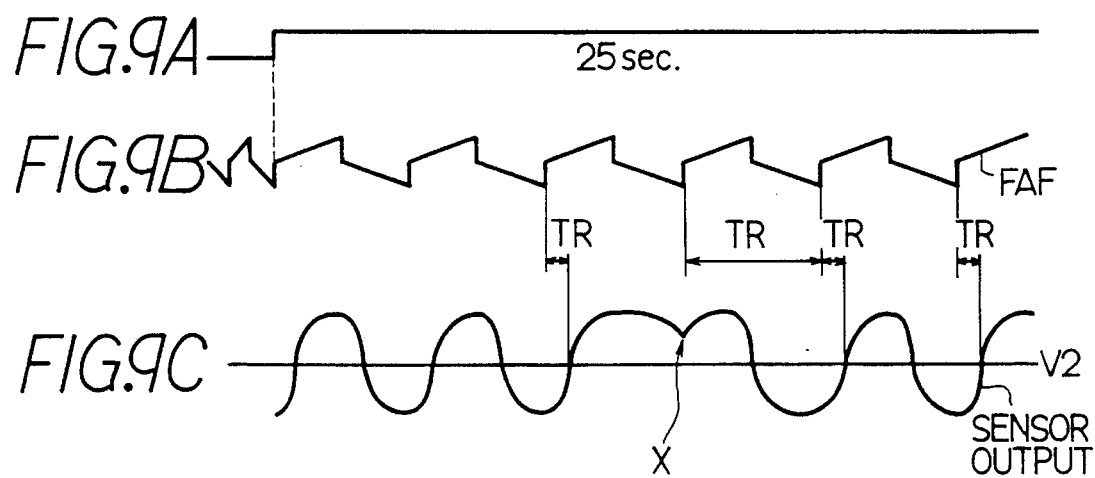

| INVERSIONS OF FAF | 15 | 20 | 25 | 30 | 35 | 40 | 45 | 50 | 55 |
|---|---|---|---|---|---|---|---|---|---|
| DETERIORATION REFERENCE | 7000 | 7000 | 11000 | 11500 | 12500 | 13500 | 13800 | 13800 | 13800 |

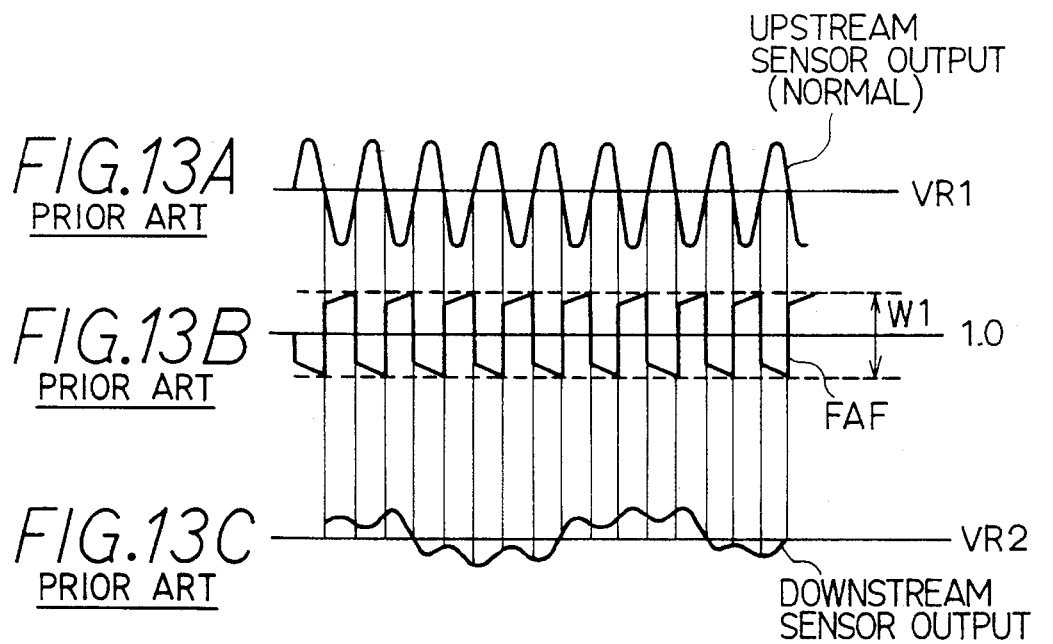
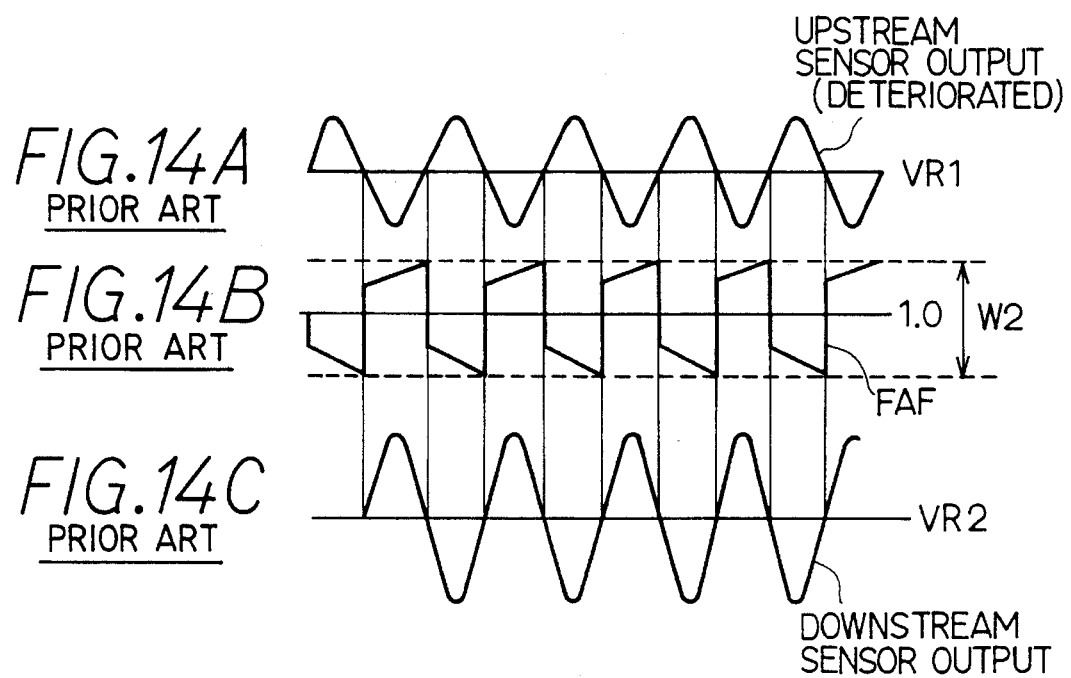

APPARARTUS FOR DETECTING DETERIORATION OF CATALYSTS

CROSS REFERENCE TO RELATED APPLICATION

This application is based on and claims priority of Japanese Patent Application No. 6-261036 filed Sep. 29, 1994, the content of which is incorporated herein by reference.

BACKGROUND OF THE INVENTION

1. Field of the Invention

The present invention relates to an apparatus for detecting deterioration of an exhaust gas purifying catalyst, by processing output signals from oxygen sensors installed respectively upstream and downstream of the catalyst.

2. Description of Related Art

In conventional exhaust gas purifying systems provided with oxygen sensors installed respectively upstream and downstream of a catalyst, the period of the output signal from the downstream oxygen sensor is longer during normal operation, than that of the upstream oxygen sensor, due to the catalyst storage effect. However when this storage effect declines due to deterioration of the catalyst, the period of the downstream oxygen sensor output signal shortens to approximately the same period as that of the upstream oxygen sensor. Upon catalyst deterioration, the amplitude of the downstream sensor output signal becomes larger compared to that when the catalyst is operating normally.

An apparatus is known to utilize this characteristic for detecting deterioration of the catalyst, as disclosed in Japanese Unexamined Patent Publication 61-286550 (U.S. Pat. No. 4,739,614), the ratio of the output signal periods of the upstream and downstream oxygen sensors is obtained, and when the ratio of their periods is smaller than a specified value or when the amplitude of the downstream oxygen sensor output signal exceeds a reference value, deterioration of the catalyst is determined to have occurred.

However, in this apparatus, when the output characteristic of the upstream oxygen sensor deteriorates and its response is delayed, the downstream oxygen sensor output signal swings between rich and lean sides at the same period since the output period of the upstream sensor output signal becomes lengthened. As a result, the ratio of output signal periods between the upstream and downstream oxygen sensors decreases and the catalyst is likely to be mistakenly determined to have deteriorated even though its operation is correct.

The air/fuel ratio feedback correction coefficient FAF, which compensates the air/fuel ratio of the mixture so that a nearly stoichiometric air/fuel mixture is supplied to the engine, alternates in steps to the rich and lean sides as shown in FIGS. 13A–13C, each time the output signal from the upstream oxygen sensor reaches a reference voltage VR1 which indicates the stoichiometric air/fuel ratio. However as described above, when the upstream oxygen sensor deteriorates, the output signal period lengthens as shown in FIGS. 14A–14C and in response, the amplitude of the air/fuel ratio feedback correction coefficient FAF increases from W1 to W2 and fluctuations in the air/fuel ratio become larger. These larger fluctuations also cause the amplitude of the downstream oxygen sensor output signal to increase. Therefore, if the catalyst deterioration is determined to have occurred in the same way as in the prior art when the large amplitude of the downstream oxygen sensor occurs, the catalyst deterioration is mistakenly determined to have occurred due to upstream oxygen sensor deterioration.

To deal with these drawbacks, the invertors have conceived an apparatus which measures the response delay time of the downstream oxygen sensor and determines catalyst deterioration has occurred when the response delay time has become shorter than a reference value. The response delay time, here, is the time from inversion between rich and lean sides of the air/fuel ratio feedback correction coefficient FAF until the downstream sensor oxygen output signal reaches the level of the reference voltage VR2.

However the inversion timing for the air/fuel ratio feedback correction coefficient FAF being the timing for response delay measurement of the downstream oxygen sensor, varies according to the response of the upstream oxygen sensor. Since the response of the upstream oxygen sensor fluctuates according to the extent of deterioration and variations in sensor quality, simply measuring only the response delay time of the downstream sensor still allows the upstream sensor response to affect by such variations and the detection accuracy of deterioration of the catalyst will decline. The inversion timing of the air/fuel ratio feedback correction coefficient FAF will also fluctuate according to variations in engine operating conditions thus affecting the response, delay time.

In order to minimize the influences from variations caused by the engine operating conditions, increasing the measurement repetitions of the downstream oxygen sensor response delay time and comparing the average value thereof with a specified value is conceivable. However in this case also there would be no improvement in effects received from upstream oxygen sensor response variations. Increasing measurements of response delay time adds to the data processing load and, hence, processing capacity for other purposes is limited or a large increase in processing capacity is required.

SUMMARY OF THE INVENTION

It is therefore an object of the present invention to eliminate influences caused by variations in upstream oxygen sensor response and engine operating conditions and improve the detection accuracy of catalyst deterioration.

This invention has a further object of minimizing the increase in processing load to determine, by efficient processing, whether or not deterioration is present in the catalyst.

According to this invention, the determination of catalyst deterioration, is performed in two stages. In the first stage of determination, the amplitude of a downstream oxygen sensor output signal is detected by amplitude detection means and based on the results of this detection, the possible presence or absence of catalyst deterioration is determined by first deterioration determination means. In this first detection means, when determined that there is no possibility of catalyst deterioration, the second stage determination is not performed and the catalyst is determined to be normal. In other words, in the first stage, the catalyst that is determined to be doubtlessly normal (no possibility of catalyst deterioration) while taking into account variations (amplitude, response) in the output signals of the upstream and downstream oxygen sensors, are identified by means of their amplitude, and the second stage determination is then omitted.

Proceeding on to the determination of the second stage is therefore limited to occasions when the possibility of catalyst deterioration is present. In the determination of the second stage, after adjusting the response of the upstream oxygen sensor to a preset value by response adjustment means, the response delay time of the downstream oxygen sensor is summed or integrated within a specified time by response delay time summing means. This sum is then compared with a deterioration reference value and a final determination is made as to whether or not deterioration is present in the catalyst by final deterioration determination means. Even if there are variations in the response of the upstream oxygen sensor at this time, by adjusting the response with a preset value, (for instance, the greatest delay of the sensors with variations at the lower limit of response) influences from variations in the upstream sensor can be eliminated. In this method, by summing the downstream oxygen sensor response delay time within the specified time interval, and comparing that sum with the deterioration reference value, detection is not as likely to be influenced by variations during engine operation, as it might be, for instance, when compared with the method using a specified number of measurement repetitions of response delay time, obtaining an average value and then comparing the average value with a reference value.

Preferably, the inversion repetitions of the air/fuel ratio feedback correction coefficient FAF are counted during the period that the response delay time of the downstream oxygen sensor is being summed, and a deterioration reference value is changed according to counted number of inversions. This process allows an optimal value to be set for the deterioration reference value according to the sum repetition count of the response delay time.

BRIEF DESCRIPTION OF THE DRAWINGS

In the accompanying drawings:

FIGS. 6A through 6E are timing charts showing an amplitude measurement method for a downstream oxygen sensor output signal;

FIGS. 7A through 7D are timing charts showing a measurement method for a main feedback frequency;

FIGS. 8A through 8C are timing charts showing a measurement method for a lean delay time TL;

FIGS. 9A through 9C are timing charts showing a measurement method for a rich delay time TR;

FIGS. 13A through 13C are timing charts showing an interrelation of an output of the upstream oxygen sensor during normal operation, an air/fuel ratio feedback correction coefficient and a downstream oxygen sensor output, respectively; and FIGS. 14A through 14C are timing charts showing an interrelation of the output of the upstream oxygen sensor during deterioration, an air/fuel ratio feedback correction coefficient and the downstream oxygen sensor output, respectively.

DETAILED DESCRIPTION OF THE PREFERRED EMBODIMENT

Figure 1:
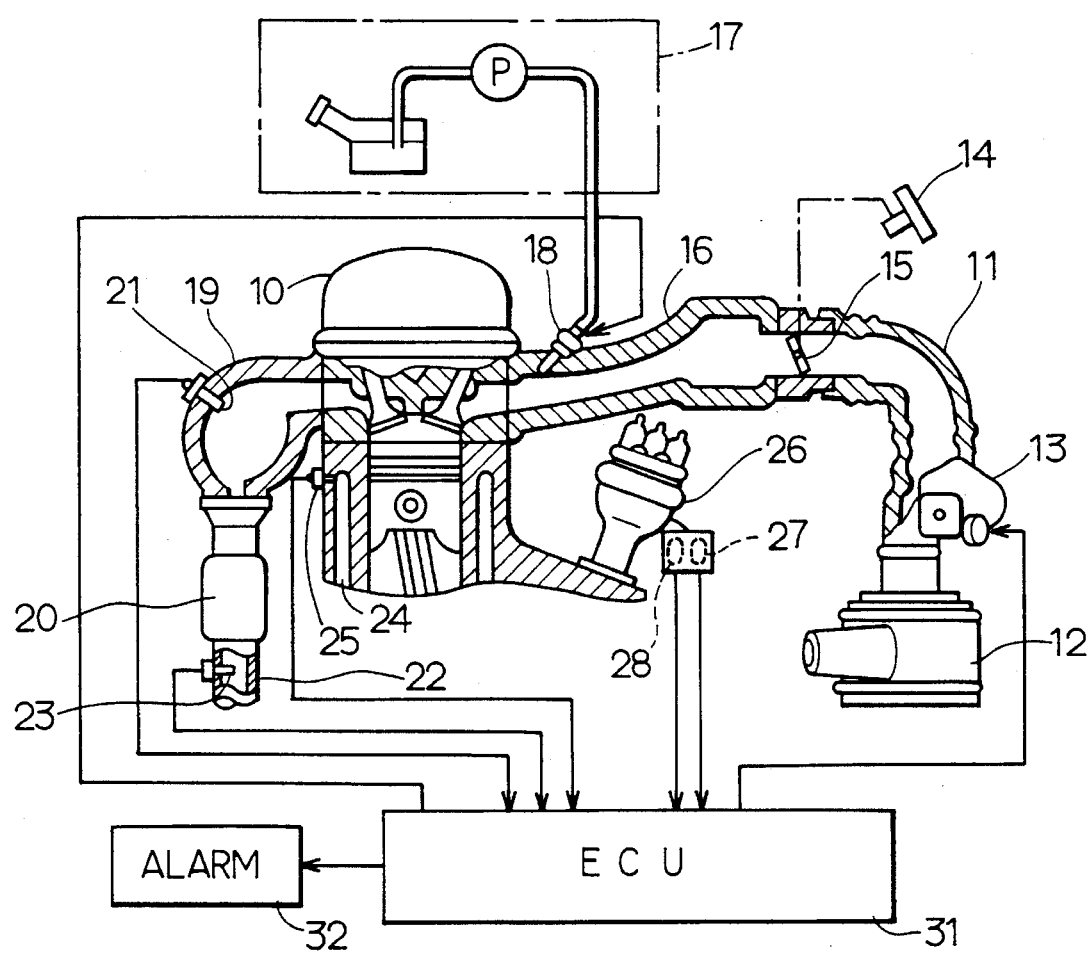
FIG. 1 is an outline view showing an overall system of one embodiment of this invention.

Hereafter an embodiment of the invention will be explained while referring to the drawings. First, the overall system in the outline view of FIG. 1 is explained. An air cleaner 12 and an air flow meter 13 to measure an intake air amount Q passing through the air cleaner 12 are provided at the upstream side of an air intake pipe 11 of an engine 10. A throttle valve 15 provided in the air intake pipe 11 is adjusted when an accelerator 14 is operated by a driver. A fuel injection valve 18 for injecting fuel supplied by a fuel supply system 17 is installed in a manifold 16 which introduces the air flowing from the air intake pipe 11 into each cylinder of the engine 10.

On the downstream side of an exhaust manifold 19 of the engine 10, however, a catalyst 20 such as a ternary or three-way catalyst is provided for simultaneous purification of toxic constituents (HC, CO, Nox) from the exhaust gas. An upstream oxygen sensor 21 is provided at the exhaust manifold 19 on the upstream side of the catalyst 20. A downstream oxygen sensor 23 is provided at the exhaust pipe 22 on the downstream side of the catalyst 20. These upstream and downstream oxygen sensors 21 and 23 generate differing output voltages according to whether the air/fuel mixture thereat is rich or lean with respect to the stoichiometric air/fuel ratio.

A water temperature sensor 25 is installed on a water jacket 24 of the engine 10 in order to detect the cooling water temperature THW. A reference position sensor for generating a reference position signal at each 720° CA, and a crank angle sensor 28 for generating a crank angle output signal every 30° CA are installed in a distributor 26 used for distributing high voltages to ignition plugs (not shown in figure) of the engine 10.

The output signals from these various sensors are input to an electronic control unit 31 (hereafter ECU). This ECU 31 is mainly comprised of a microcomputer (not shown in figure) and calculates a basic fuel injection amount according to the intake amount Q detected by the airflow meter 13, the cooling water temperature detected by the water temperature sensor 25, and the engine speed calculated from the crank angle sensor output from the crank angle sensor 28. This ECU 31 also corrects the basic fuel injection amount according to the output signals from the upstream and downstream oxygen sensors 21 and 23 and determines a final fuel injection amount so that the purification ratio of the catalyst 20 will be at a maximum. A control signal indicative of this fuel injection amount is sent to the fuel injection valve 18 to control the fuel injection operation.

This ECU 31 implements various routines shown in FIG. 2 through FIG. 5 described later, in order to detect whether or not deterioration is present in the catalyst 20 based on output signals from the upstream and downstream oxygen sensors 21 and 23, and when deterioration is detected, operates an alarm 32 to warn the vehicle driver.

A feature of the deterioration determination method of the catalyst 20 in this embodiment is that the determination is carried out in two stages. In the first determination stage, the amplitude of the output signal of the downstream oxygen sensor 23 is detected, this amplitude compared with a reference value and a determination then made on possible deterioration of the catalyst 20. In this first determination stage, if determined that there is no possible deterioration of the catalyst 20, then the second determination stage is not performed and the catalyst is determined to be normal. In other words, in this first stage determination, if the catalyst is clearly determined to be normal (no possibility of catalyst deterioration) while taking into account variations (amplitude and response) in the output signals of the upstream oxygen sensor 21 and the downstream oxygen sensor 23, then the second stage determination is omitted.

Proceeding on to the determination of the second stage is therefore limited to occasions when the possibility of catalyst deterioration is present. In the second stage determination, after adjusting the response of the upstream oxygen sensor 21 to a proper value by response adjustment means, (to the lower variation limit of the sensor with the slowest response) the response delay time of the downstream oxygen sensor 23 is summed within a specified time by response delay time summing means. This sum is then compared with a deterioration reference value and a final determination is made as to whether or not deterioration is present in the catalyst 20 by final deterioration determination means.

Figure 2:
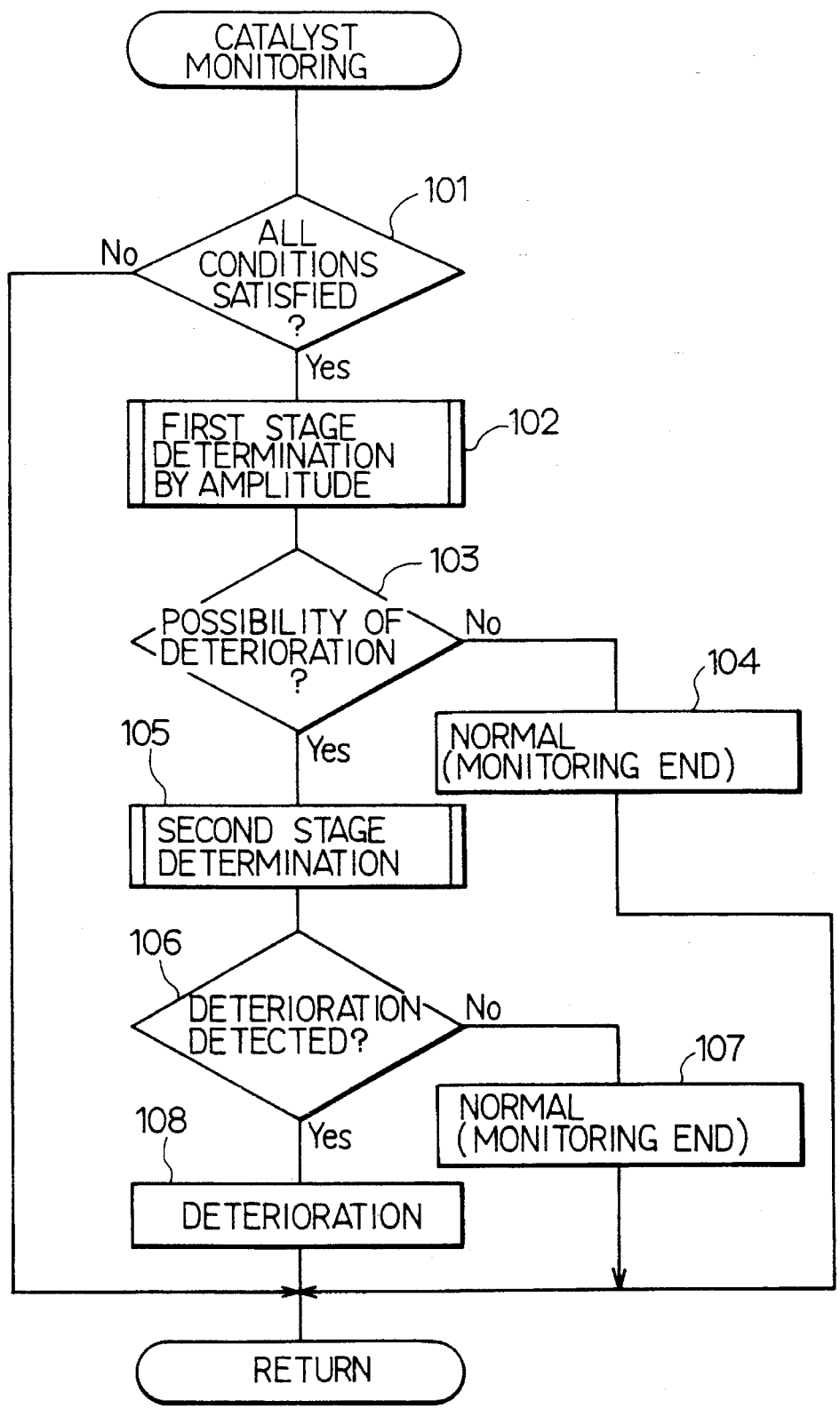
FIG. 2 is a flowchart showing a processing flow of a catalyst monitoring routine.

The processing flow for each routine in detection of deterioration of the catalyst 20 is next described in detail. FIG. 2 shows a catalyst monitoring routine in which interrupt processing is done every 64 milliseconds during feedback control of the air/fuel ratio. Step 101 in this routine first determines whether or not catalyst deterioration determining conditions (1) through (6) have been established:

(1) engine rotation speed is within a specified range;
(2) air intake pipe pressure is within a specified range;
(3) vehicle speed is within a specified range;
(4) engine has been warmed up;
(5) engine condition is not transitive; and
(6) engine is not idling.

Figure 3:
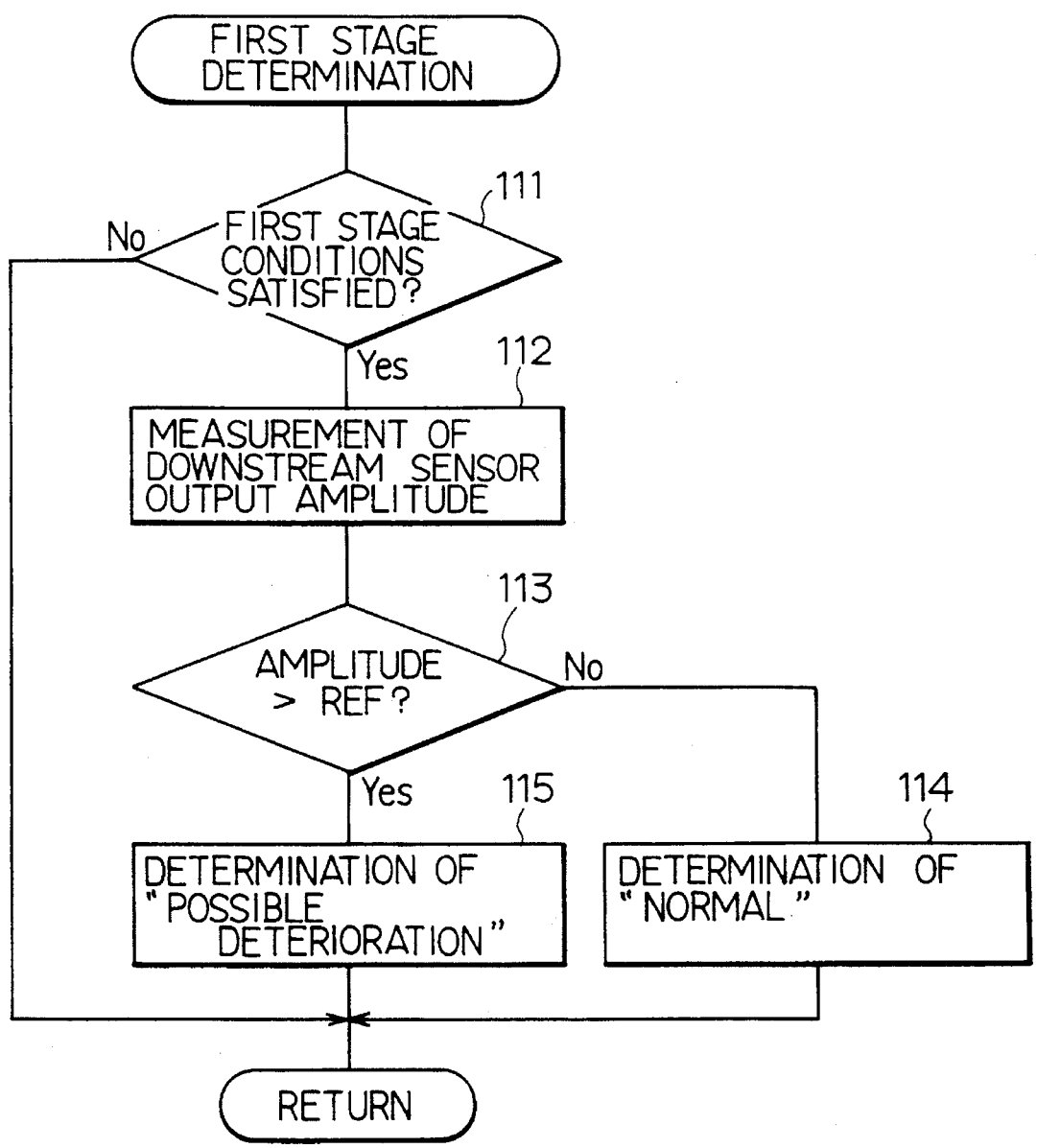
FIG. 3 is a flowchart showing a processing flow of a first stage determination routine.

Subsequent catalyst deterioration detection is not performed and this routine is terminated, if even one among the above six conditions has not been established. If all of the above catalyst deterioration detection conditions have been established, the operation proceeds to step 102 and first stage determination is performed to detect the possible presence of deterioration of the catalyst 20 by means of the amplitude of the output signal of the downstream oxygen sensor 23. In this first stage determination, as shown in FIG. 3, 16 ms interrupt processing is performed by means of the first stage determination routine. This first stage determination routine fulfills the role of "first deterioration discrimination means".

In this first stage determination routine, first, in step 111 it is determined whether or not the first stage catalyst deterioration detection conditions have been established. In these first stage detection conditions, there must be no excessive transient operation and no fuel cutoff. Only when these conditions have been established, does the process proceed to step 112 in which the output amplitude of the downstream oxygen sensor 23 is measured as follows.

Amplitude measurement begins when the amplitude measurement flag inverts to "1" as shown in FIG. 6A, and at each amplitude measurement, a first measurement counter C1 (hereafter counter C1) counts up one in synchronism with the rich/lean inversion timing of the air/fuel ratio feedback correction coefficient FAF as shown in FIGS. 6B through 6D. This means that, when the count of the amplitude measurements (value of first counter C1) reaches the three, for instance, the amplitude measurement flag inverts to "0" and the first counter C1 in synchronization is cleared to "0". At this time, the second measurement counter C2 (hereafter counter C2) counts up by one. By repeating the above process for three times, for instance, measuring the amplitude three times (or a total of nine (3×3) times), a final average measurement value is obtained for the amplitude. This amplitude measurement processing of step 112 fulfills the role of "amplitude detection means".

Figures 10, 11:
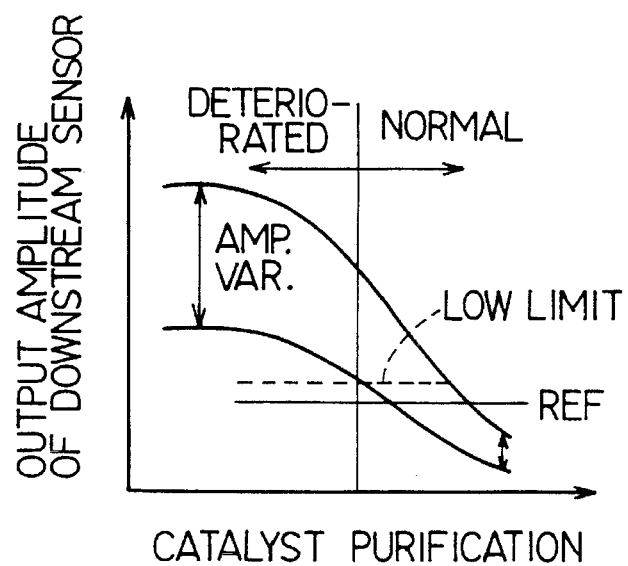
FIG. 10 is a table showing an air/fuel ratio feedback correction coefficient and a deterioration reference value.
FIG. 11 is a graph showing a relation between a catalyst purification rate and downstream oxygen sensor amplitude variations.

After amplitude measurement, operation proceeds to step 113 of FIG. 3 in which the amplitude of the output signal of the downstream oxygen sensor 23 is compared with a reference value. As shown in FIG. 11, while taking into account the output signal variation of the downstream oxygen sensor 23 (amplitude and response) or the output signal variation of the upstream oxygen sensor 21 (amplitude and response), a determination reference is set to determine normal catalyst operation (no possibility of deterioration) without error. In other words, as shown in FIG. 11, if it is within the lower limit of variation with respect to the boundary line between normal catalyst range and deteriorated catalyst range, then there is no possible deterioration of catalyst 20 and catalyst operation may be considered normal.

The reference value in this embodiment is set lower than the low limit for amplitude variations. The catalyst is determined normal in step 113 of FIG. 3, when the amplitude is less than or equal to the reference value. The first stage determination results in "normal" (step 114). If in step 113 the amplitude is determined to be greater than the reference value, then possible deterioration is present in the catalyst 20 so the first stage determination results in "possible deterioration" (step 115).

As mentioned above, when the first stage determination results are issued, the first stage determination routine is ended and operation proceeds to step 103 of FIG. 2. A determination is made from the first stage determination results as to whether or not "possible deterioration" is present. If the determination is "No", then catalyst 20 is determined to be normal and monitoring is terminated (step 104).

Figure 4:
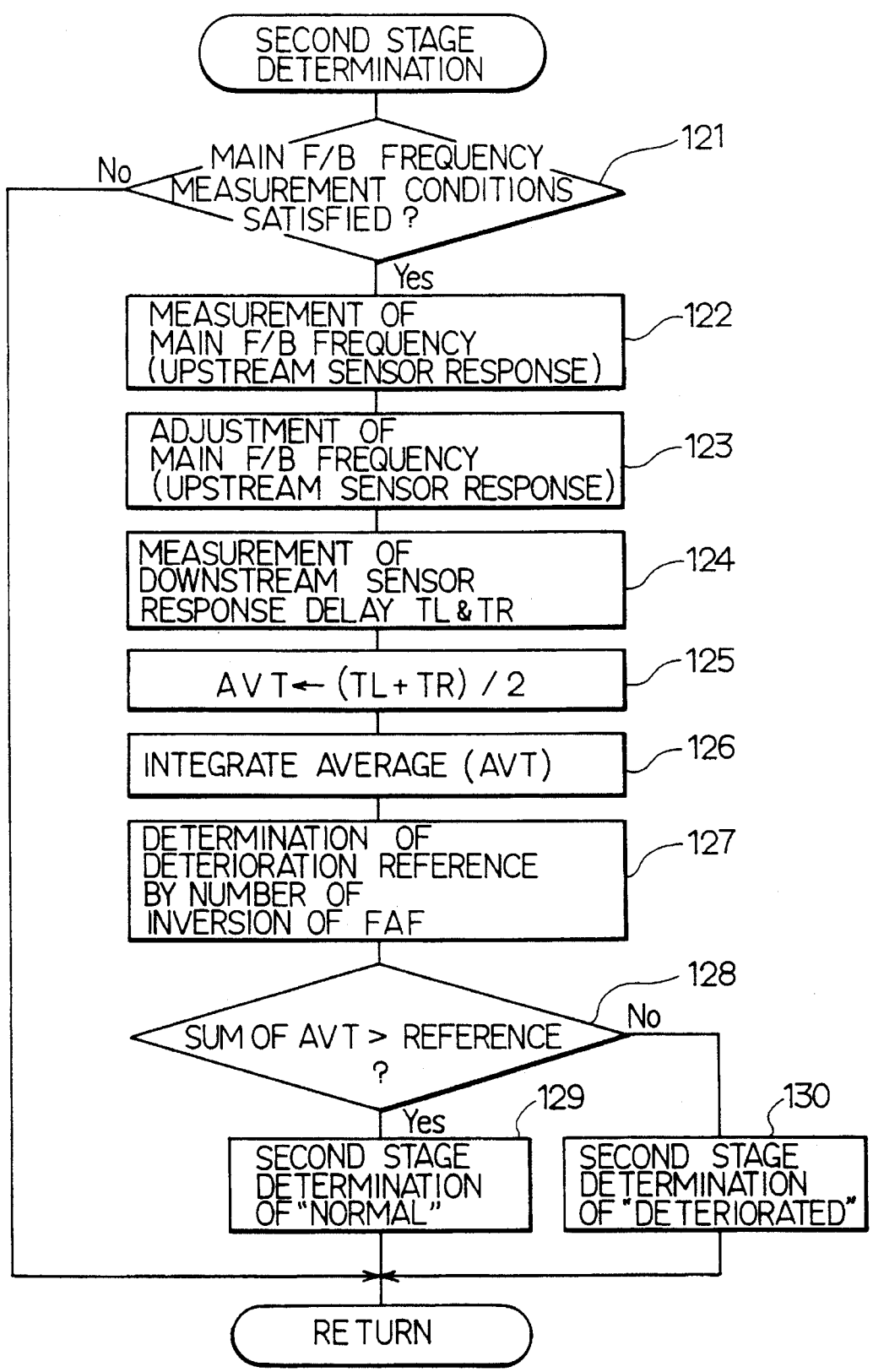
FIG. 4 is a flowchart showing a processing flow of a second stage determination routine.
Figure 5:
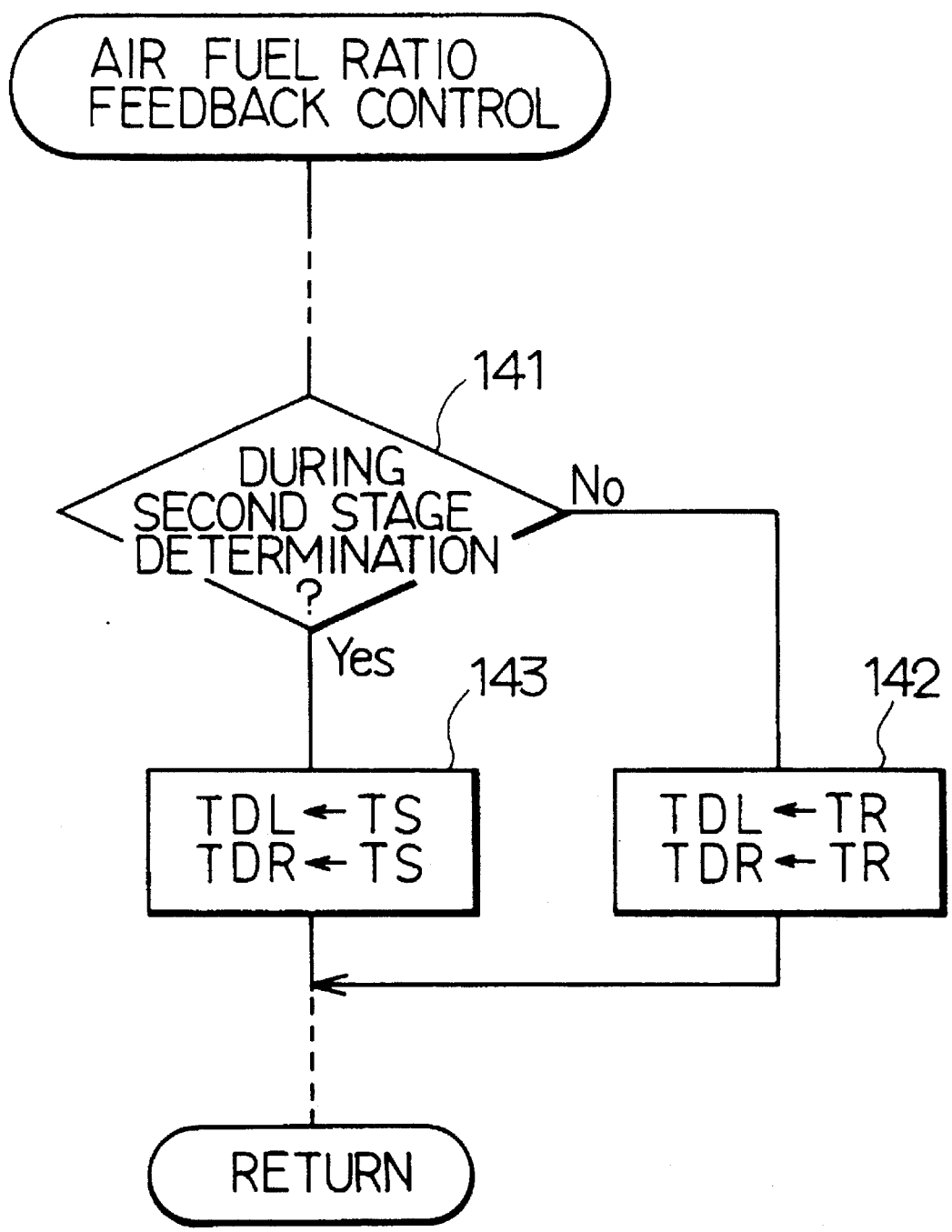
FIG. 5 is a flowchart showing a processing flow of a portion of an air/fuel mixture feedback control routine.

Operation therefore proceeds to step 105 and second stage determination is performed only when "possible deterioration" is determined from the first detection stage results. In this second stage determination, interrupt processing is implemented as shown in FIG. 4 each 64 milliseconds for instance by means of the second stage determination routine. This second stage determination routine fulfills the role of "second deterioration discrimination means".

First, in step 121 of this second stage determination routine, it is determined if main feedback frequency measurement conditions are established for feedback control the air/fuel ratio feedback correction coefficient FAF is used by which based on the output signal from the upstream oxygen sensor 21. Here, main feedback frequency measurement conditions refer, for instance, to an activized or operative status for the upstream oxygen sensor 21. Only when this condition has been established does operation proceed to step 122. The main feedback frequency is measured as follows.

Main feedback frequency measurement commences when the frequency measurement flag has inverted to "1" as shown in FIG. 7A. The frequency counter C1 is synchronized with the rich/lean inversion timing of the air/fuel ratio feedback correction coefficient FAF as shown in FIGS. 7B and 7C and counts up by one. The timer counter increments upward during this frequency measurement as shown in FIG. 7D and upon reaching a preset count value (for instance 20 seconds) the frequency measurement flag inverts to "0" and the upward count of frequency counter C1 is terminated. The count value of the frequency counter C1 at this time is the main feedback frequency (inversion count within a specified time). Since this main feedback frequency can increase and decrease according to the response of the upstream oxygen sensor 21, measuring the main feedback frequency is an effective method for measuring response of the upstream oxygen sensor 21.

After measuring the main feedback frequency as described above, operation proceeds to step 123 of FIG. 4, in which the main feedback frequency is adjusted to a target setting (slowest response taking into account variations in response of upstream sensor 21). Adjustment of the main feedback frequency during the air/fuel ratio feedback control routine of FIG. 5 for interrupt processing every 4 ms is performed as follows. First of all, whether or not the second stage determination is currently being implemented is determined in step 141, if not being implemented, then the lean mixture time delay constant (hereafter TDL) and the rich mixture time delay constant (hereafter TDR) are both set to the same first setting TR (step 142). However, if the second stage determination is currently being implemented, then the TDL and the TDR are both set to the same second setting TS (step 143) which is smaller than the first setting TR.

At this point, even if the output signal from the upstream oxygen sensor 21 reverses from rich to lean, the TDL (or lean mixture time delay constant) will have a negative count value that maintains a delay time to ensure delay processing is performed to ensure a rich determination. When this TDL is set to the second setting TS which is smaller than the first setting TR; a delay time of, for instance, 12 milliseconds will lengthen to a time of 240 milliseconds, and the changing period of the air/fuel ratio feedback correction coefficient FAF (main feedback period) will become longer.

On the other hand, even if the output signal from the upstream oxygen sensor 21 reverses from lean to rich, the TDR (or rich mixture time delay constant) will have a positive count value that maintains a delay time to ensure delay processing is performed to ensure a lean determination. When this TDR is set to the second setting TS which is smaller than the first setting TR; a delay time of 64 milliseconds will lengthen to a time of 240 milliseconds, and the changing period of the air/fuel ratio feedback correction coefficient FAF (main feedback period) will become longer.

In this embodiment, the main feedback frequency (response of upstream oxygen sensor 21) is adjusted to the slowest response, by setting a small value as the second setting TS in order to match the slowest response while taking into account variations in response characteristics of the upstream sensor 21, and by setting the lean and rich mixture time delay constants TDL and TDR as the second setting TS. Step 143 which performs this processing thus fulfills the role of "response adjustment means".

After adjusting the main feedback frequency, the process proceeds to step 124 of FIG. 4 in which the TL and TR response times of the downstream oxygen sensor 23 are measured. As shown in FIGS. 8A through 8C, TL (hereafter called the "lean delay time") is the time required for the output signal of the downstream oxygen sensor 23 to reach a specified voltage V2, after the air/fuel ratio feedback correction coefficient FAF has inverted from rich to lean correction. As shown in FIGS. 9A through 9C, on the other hand, TR (hereafter called the "rich delay time" is the time required for the output signal of the downstream oxygen sensor 23 to reach the specified voltage V2, after the air/fuel ratio feedback correction coefficient FAF has inverted from lean to rich correction.

As shown in FIGS. 8A–8C and 9A–9C, measurement of these TL and TR, lean and rich delay times, is commenced after a specified number of inversions (for instance one) of the output signal of the downstream oxygen sensor 23 in order to ensure stable measurement after the lean and rich delay time flag (FIGS. 8A and 8B) has inverted to "1". In the event the downstream oxygen sensor 23 does not invert as shown at point in FIG. 8C and FIG. 9C, then the TL and TR, lean and rich delay times, become the main feedback period. The lean and rich delay time flag inverts to "0" after a specified time (for instance, 25 seconds) has elapsed, and measurement of these TL and TR, lean and rich delay times, is ended.

In this embodiment, an average value AVT of the TL and TR, lean and rich delay times, for each period is calculated [=(TL+TR)/2] (step 125), and the average delay times are summed (step 126). The reason for summing or integrating the average value of the TL and TR is to prevent overflow of a summing counter. Therefore, if there is a surplus capacity in the summing counter then the processing in step 125 can be omitted and the lean and rich delay times TL and TR can be summed without an average value being taken. Thus step 126 which sums or integrates the average delay time, fulfills the role of "response delay time summing means".

Proceeding to step 127 after integrating the average delay time AVT, a deterioration determination reference value is determined according to the number of inversion (main feedback frequency) of air/fuel ratio feedback correction coefficient FAF. More specifically, an inversion count is made of the air/fuel ratio feedback correction coefficient FAF during the summing period of the average delay time. The deterioration determination reference value can be obtained according to the corresponding inversion count for the air/fuel ratio feedback correction coefficient FAF by referring to the table in FIG. 10.

Proceeding next to Step 128, the deterioration reference value read from the table in FIG. 10 is compared with the summed average delay time and, if the summed value of the average delay time is greater than the deterioration reference value, then the determination of the second stage results in "normal" (step 129). However, if the summed value of the average delay time is less than or equal to the deterioration reference value, then the determination of the second stage results in "deterioration". Thus the final determination of the presence or absence of deterioration in steps 128 to 130, fulfills the role of "final deterioration discrimination means".

Proceeding to step 106 of FIG. 2 when the second stage determination routine is complete, a determination is made as to whether deterioration was found or not in the second stage determination, if deterioration is not detected then catalyst 20 is determined to be normal and monitoring is ended (step 107). If deterioration is detected in the second stage determination, then catalyst 20 is determined to have "deterioration" (step 108) and along with driving an alarm 32 to warn the driver. Data during catalyst deterioration is stored for diagnostics purpose.

As explained previously, the determination of deterioration of catalyst 20, according to this embodiment, is divided into two stages.

In the first stage determination, the amplitude of the output signal of the downstream oxygen sensor 21 is detected, and this amplitude is compared with the reference value REF to determine the possible presence of deterioration of the catalyst 20. As shown in FIG. 11, this reference value is set to determine without fail normal operation (no possibility of catalyst deterioration) while taking into account variations (amplitude, response) in the output signals of the upstream oxygen sensor 21 or the downstream oxygen sensor 23 so that if no possible catalyst deterioration is found, the second stage determination is not performed and the catalyst 20 is determined to be normal. In other words, in the first stage determination, the oxygen sensor output whose amplitude is proper (no possibility of deterioration) while taking into account variations (amplitude, response) in the output signals of the upstream oxygen sensor 21 and the downstream oxygen sensor 23, is determined to be normal and the second stage determination then omitted. This allows an increase in the processing load of the ECU 131 to be limited to a minimum and the presence or absence of deterioration of the catalyst 20 to be determined with efficient operation processing.

On the other hand, when the possibility of catalyst deterioration is present, the operation proceeds to the second stage determination. In detection in the second stage, the response of the upstream oxygen sensor 21 (main feedback frequency) is adjusted to that of the slowest response, while taking into account variations, so that even if variations are present in the response of the upstream oxygen sensor 21, the influence of such variations can be reduced. Further, the response delay time of the downstream oxygen sensor 23 is summed within a specified period and that sum is compared with the deterioration reference value to finally determine the presence or absence of catalyst deterioration. This has the advantage in that, relative to the case of measuring the response delay time a specified number of times obtaining its average value and comparing that average value with a reference value, the determination is not influenced so much by variations in engine operating status.

Figure 12A:
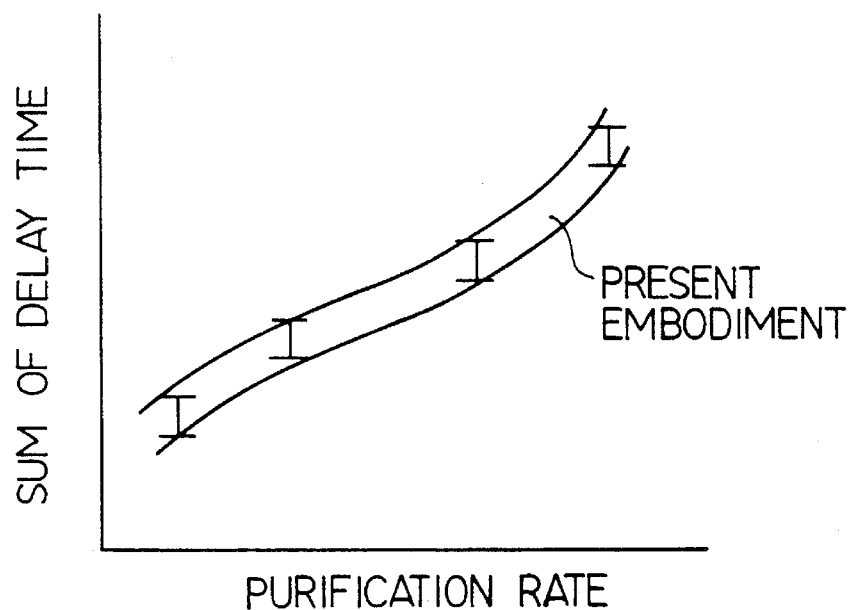
FIGS. 12A and 12B are graphs showing a summed value for a response delay time versus a catalyst purification rate in the embodiment of this invention and a relation of the response delay time (average value) versus the catalyst purification rate when comparing a reference value and an average value obtained by a specified number of measurements of the response delay time, respectively.
Figure 12B:
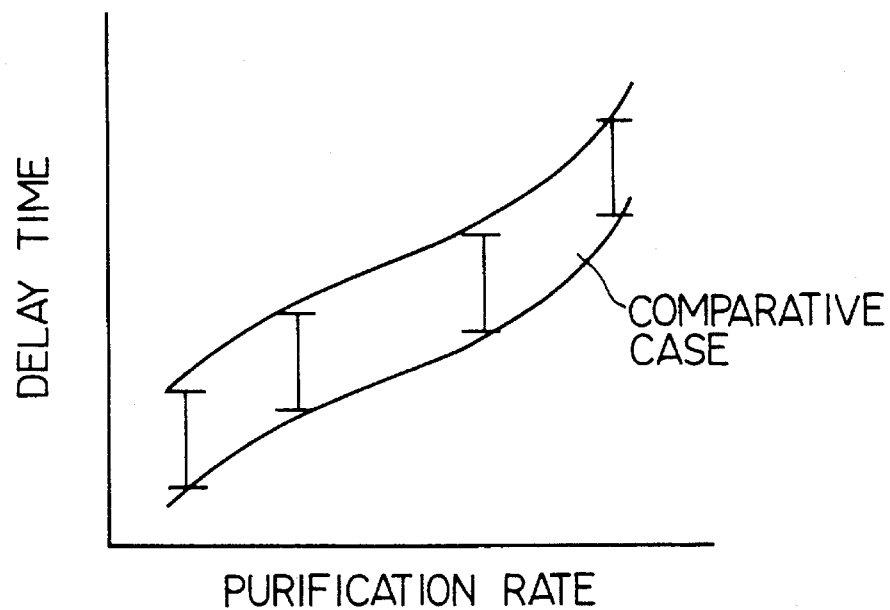

FIG. 12A is a graph showing the summed value for the response delay time versus the catalyst purification rate in this embodiment. FIG. 12B shows the relation of the response delay time (average value) versus the catalyst purification rate when comparing a reference value against an average value obtained by a specified number of measurements of the response delay time. In the case shown in FIG. 12B, large variations in response delay time occur resulting from the influence of variations in the engine operating status but, in this embodiment as shown in FIG. 12A, by setting a somewhat longer summing period (for instance, about 25 seconds ) for the response delay time, the influence of variations in the engine operating status is not so large and variations in the sum of response delay times can be reduced, thus making response delay time less susceptible to variations in the upstream oxygen sensor 21 and variations in the engine operating status to enable highly accurate deterioration determination.

In this embodiment, during summing of the response delay time of the downstream oxygen sensor 23, a count is made of the number of inversion repetitions of the air/fuel ratio feedback correction coefficient FAF (i.e., the number of summation of the response delay time). The deterioration determination reference value is changed according to this inversion count. Thus, an optimum value can be set as the deterioration reference value in response to the response delay time sum, thus providing a yet higher level of detection accuracy of catalyst deterioration.

The time period for summing the response delay time was set at 25 seconds in this embodiment but, needless to say, this can be shortened or lengthened as conditions demand.

The present invention may be modified in many other ways without departing from the spirit of the invention.

What is claimed is:

1. A deterioration detection apparatus for a catalyst located in an exhaust system of an internal combustion engine, said apparatus comprising:

an upstream oxygen sensor and a downstream oxygen sensor located respectively upstream and downstream of said catalyst to detect whether an air/fuel ratio is rich or lean with respect to a stoichiometric air/fuel ratio;

amplitude detection means for detecting an amplitude of an output signal from said downstream oxygen sensor;

first deterioration determination means to determine whether deterioration of said catalyst is likely to be present on the basis of detection results of said amplitude detection means; and second deterioration determination means to determine the presence of deterioration when possible deterioration is determined by said first determination means, wherein said second deterioration determination means includes:

response adjustment means to adjust a response of said upstream oxygen sensor to a preset value, response delay time summing means to sum a response delay time occurring within a specified period in said downstream oxygen sensor after adjusting the response of said upstream oxygen sensor, and final deterioration determination means to determine whether deterioration is present in said catalyst by comparing the sum from said response delay time summing means with a reference value indicating catalyst deterioration.

2. A deterioration detection apparatus for a catalyst of claim 1, wherein said second deterioration determination means further includes;

means for counting a number of inversions of an air/fuel ratio feedback correction coefficient during the specified period in which the response delay time of said downstream oxygen sensor is summed, and altering said catalyst deterioration determination value in accordance with the counted number of inversions.

3. A deterioration detection apparatus for a catalyst of claim 1, wherein said response adjustment means includes:

means for lengthening the response of said upstream oxygen sensor when said deterioration determination means operates than when said deterioration determination does not operate.

4. A deterioration detection apparatus for a catalyst of claim 1, wherein said response delay time summing means includes:

means for obtaining the response delay time of said downstream oxygen sensor from a timing at which an output signal of said upstream oxygen sensor adjusted by said response adjustment means inverts between rich and lean levels thereof.

5. A deterioration detection apparatus for a catalyst of claim 4, wherein said response delay time summing means includes:

means for summing an average value of the response delay time which is obtained when the output signal of said downstream oxygen sensor changes from the rich level to the lean level and from the lean level to the rich level.

6. A deterioration detection apparatus for a catalyst of claim 1, wherein said second deterioration determination means further includes:

means for measuring a frequency of an air/fuel ratio feedback correction coefficient so that the measured frequency is used to adjust the response of said upstream oxygen sensor by said response adjustment means.

7. A deterioration detection apparatus for a catalyst of claim 1, wherein said second deterioration determination means further includes:

means for measuring response delay times of said downstream oxygen sensor and averaging the measured delay times so that an averaged delay time is used as said response delay time to be summed by said response delay time summing means.

* * * * *